Figure 1:
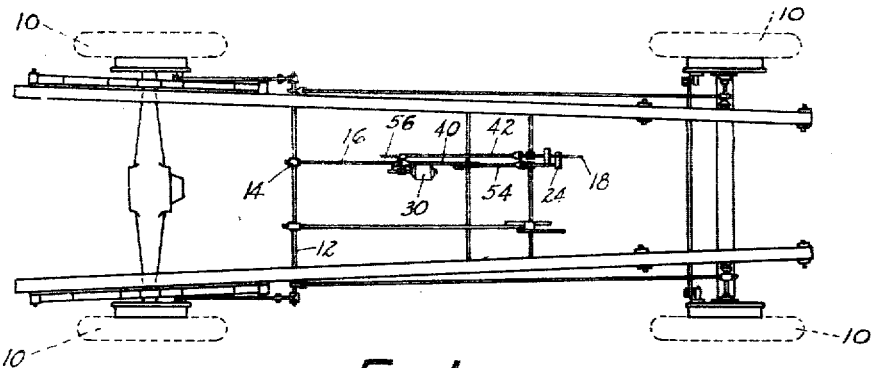

Sept. 28, 1926.

B. G. PARSONS 1,601,412

ELECTRIC SERVO FOR VEHICLE BRAKES

Filed Feb. 24, 1925

INVENTOR
BEN G. PARSONS
BY
ATTORNEY

Patented Sept. 28, 1926.

1,601,412

UNITED STATES PATENT OFFICE.

BEN G. PARSONS, OF SOUTH BEND, INDIANA.

ELECTRIC SERVO FOR VEHICLE BRAKES.

Application filed February 24, 1925. Serial No. 11,162.

This invention relates to brakes, and is illustrated as embodied in an automobile chassis. An object of the invention is to provide a novel power device, shown operated by an electric motor, controlled by the brake pedal or other operating member, and operative to set the brakes. I consider it highly desirable to arrange the device so that the driver may apply the brakes directly by the same operating member, in case power is not available for any reason, or is insufficient. One arrangement includes a connection for applying the brakes by power, and which is also operative to control the power, as by opening a switch for the motor circuit to prevent waste of current by running the motor continuously while the brakes are on. In the arrangement shown in the drawings, depression of a pedal closes the motor circuit and at the same time throws in a clutch geared to the motor, the clutch operating through a novel linkage to apply the brakes, and application of the brakes in a degree depending on the position of the pedal then serving to open the motor circuit again. Preferably the clutch is operated by the motor through an irreversible gearing, so that the brakes, when once applied, are held until the pressure on the pedal is released.

Figure 2:
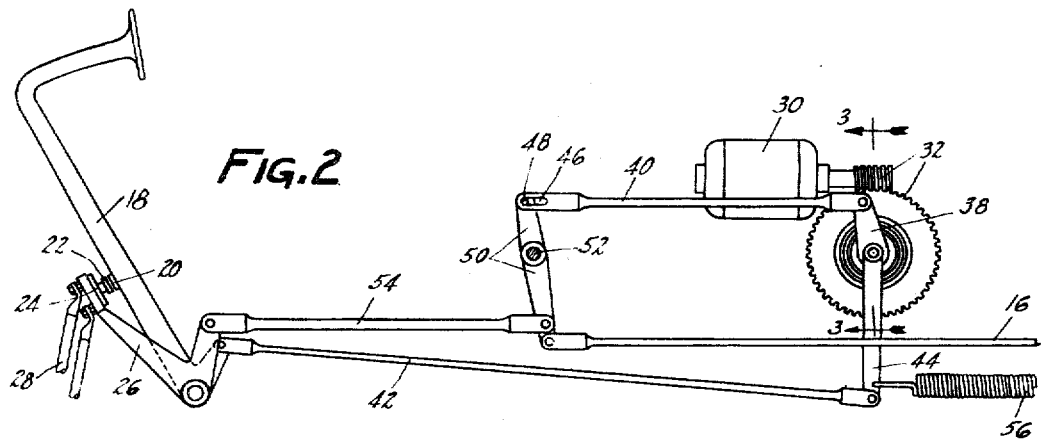
Figure 3:
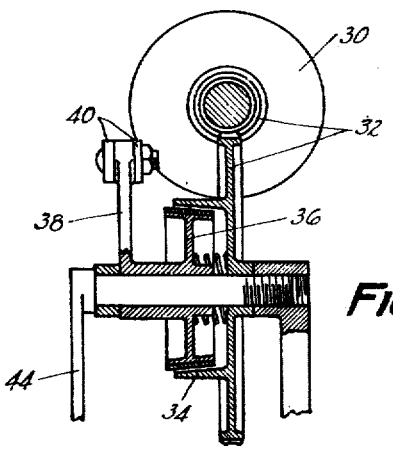

The above and other objects and features of the invention, including various novel combinations of parts and desirable particular constructions, will be apparent from the following description of one illustrative embodiment shown in the accompanying drawings, in which:

Figure 1 is a diagrammatic top plan view of an automobile chassis having brakes on its four wheels; and Figure 2 is a side elevation of the pedal and the connections from the pedal controlling the motor and clutch; and Figure 3 is a sectional view of the gearing between the motor and clutch.

In the arrangement selected for illustration, the chassis includes road wheels 10 having brakes operated by a linkage connected to a rock shaft 12, the shaft 12 having an arm 14 connected to a link 16, which is thus operative to set all the brakes.

The brakes are controlled by a pedal 18 having a projection 20 which, after a short lost motion, engages the plunger 22 of an electric switch 24 mounted on one arm of a bellcrank lever 26, thus closing the circuit 28 of an electric motor 30. Motor 30 operates through worm gearing 32 to turn one member 34 of a friction clutch, the other member 36 of which carries an arm 38 pivoted to a link 40. Depression of pedal 18 also operates through a link 42 to rock an arm 44 to force the two friction clutch members 34 and 36 together, so that member 36 is turned by the motor to apply force to link 40.

Link 40 is formed with a slot 46 embracing a pin 48 carried by a lever 50 pivoted at 52, so that when the clutch is operated by depressing the pedal, the lever is rocked, while if the current is not on, or if the motor cannot supply sufficient force, lever 50 can be rocked manually on account of the lost motion allowed by slot 46. Lever 50 is connected by a link 54 to the bellcrank lever 26, and also to the link 16 which applies the brakes. When the pedal is released, a spring 56 opens the clutch.

In operation, when the pedal is depressed, the clutch is closed and the switch 24 is operated to close the motor circuit; the motor then operates through link 40 to rock lever 50 and apply the brakes. As soon as the brakes have been applied in a degree which is a function of the position of the pedal, lever 50 operates through link 54 to rock the bellcrank lever away from the pedal and open the switch again. Any slippage of the clutch, or any further depression of the pedal, again closes the switch to apply more power to the brake, while when the pedal is released the spring 56 returns the parts to normal positions.

While one illustrative embodiment has been described in detail, it is not my intention to limit the scope of the invention to that particular embodiment, or otherwise than by the terms of the appended claims.

I claim:

1. A vehicle having, in combination, braking means, a controlling member, power-operated means, and connections controlled by said member for applying the brakes by the power of said means to an extent determined by the position of said member and then cutting off the power and holding the brakes, said member being arranged to permit the application of manual power directly to said connections.

2. A vehicle having, in combination, braking means, a controlling member, an electric motor, a circuit for the motor, and connections from said member for applying the braking means to an extent determined by the position of said member by the power of the motor and then automatically opening the motor circuit, said member being arranged to permit the application of manual power directly to said connections.

3. A vehicle having, in combination, electrically-operated brakes a circuit therefor including a switch, an operating member, a carrier for the switch, the switch being arranged to be engaged by the operating member for closing the circuit, and means mechanically operated by application of the brakes for moving the carrier away from the operating member to open the circuit.

4. A vehicle having, in combination, brakes, a clutch, means operated by the clutch for applying the brakes, electric means for driving the clutch, a circuit for said means, an operating member, connections from the operating member for throwing in the clutch and closing the circuit, and means operated by the clutch for operating said connections to open the circuit without throwing out the clutch.

5. A vehicle having, in combination, braking means, an electric motor arranged to operate said means, a switch controlling the motor circuit, a lever for closing the switch, and means mechanically operated by the motor for moving the switch away from the lever to open it again.

6. A vehicle having, in combination, operating connections, an electric motor arranged to operate said connections, a motor circuit including a switch, an operating pedal, and a lever carrying the switch in the path of the pedal and arranged to operate the connections manually in case the power of the motor is insufficient.

7. A vehicle having, in combination, braking means, an electric motor arranged to operate said means, a switch controlling the motor circuit, a manually-operated member for closing the switch, and means operated by the motor for moving the switch in a direction to open it again when the motor has turned through an angle determined by the extent of movement of said member, together with connections from the same member for applying the brakes manually.

8. A vehicle having, in combination, braking means, a controlling lever, an adjacent lever arranged to operate the braking means, a power device, and means for controlling said device carried by the adjacent lever in the path of the controlling lever and rocking the adjacent lever to apply the brakes when power is not available, said means operating to cause the power device to become operative to apply the braking means when engaged by the controlling lever, and the application of the brakes rocking said adjacent lever to move the controlling means away from the controlling lever to cut out the power device.

9. A vehicle having, in combination, braking means, a controlling lever, an adjacent lever, a power device arranged to operate the braking means, and means for controlling said device carried by the adjacent lever in the path of the controlling lever, said means operating to cause the power device to become operative to apply the braking means when engaged by the controlling lever, and the application of the brakes rocking said adjacent lever to move the controlling means away from the controlling lever to cut out the power device.

10. Operating mechanism comprising, in combination, an electric motor, an operating part moved thereby, a controlling switch for the motor circuit, a controlling lever movable to engage and close the switch, and means operated by movement of said operating part by the motor to move the switch bodily away from the controlling lever to open the motor circuit.

11. Operating mechanism comprising, in combination, an electric motor, reduction gearing driven by the motor, an operating part moved by the gearing, a controlling switch for the motor circuit, a controlling lever movable to engage and close the switch, and means operated by movement of said operating part by the motor to move the switch bodily away from the controlling lever to open the motor circuit.

12. Operating mechanism comprising, in combination, an electric motor, a movable operating part, gearing driven by the motor and moving said part, the gearing including a clutch, a switch controlling the motor, a controlling lever arranged to engage and close the switch and to throw in the clutch, and means operated by movement of the operating part to shift the switch with respect to the controlling lever to open the switch again.

13. Operating mechanism comprising, in combination, an electric motor, a movable operating part, gearing driven by the motor and moving said part, the gearing including a clutch, a switch controlling the motor, a controlling lever arranged to engage and close the switch and to throw in the clutch, and means operated by movement of the operating part to shift the switch with respect to the controlling lever to open the switch again without throwing out the clutch, reverse movement of the controlling lever throwing out the clutch without affecting the switch.

14. Brake-operating mechanism comprising, in combination, a brake-applying lever (50) having a brake connection (16) at one end and fulcrumed between its ends, a manually-operated lever (18) having lost-motion connection to said end of the lever, and power-operated means (40) having lost-motion connection to the opposite end of the lever.

In testimony whereof I have hereunto subscribed my name.

BEN G. PARSONS.

spect to the controlling lever to open the switch again without throwing out the clutch, reverse movement of the controlling lever throwing out the clutch without affecting the switch.

14. Brake-operating mechanism comprising, in combination, a brake-applying lever (50) having a brake connection (16) at one end and fulcrumed between its ends, a manually-operated lever (18) having lost-motion connection to said end of the lever, and power-operated means (40) having lost-motion connection to the opposite end of the lever.

In testimony whereof I have hereunto subscribed my name.

BEN G. PARSONS.

Certificate of Correction.

It is hereby certified that Letters Patent No. 1,601,412, granted September 28, 1926, upon the application of Ben G. Parsons, of South Bend, Indiana, for an improvement in "Electric Servos for Vehicle Brakes," was erroneously issued to the inventor, said Parsons, whereas said Letters Patent should have been issued to *The Bendix Brake Company*, as assignee of the *entire* interest in said invention, as shown by the records of assignments in this office; and that the said Letters Patent should be read with this correction therein that the same may conform to the record of the case in the Patent Office.

Signed and sealed this 16th day of November, A. D. 1926.

[SEAL.]
M. J. MOORE,
*Acting Commissioner of Patents.*

Certificate of Correction.

It is hereby certified that Letters Patent No. 1,601,412, granted September 28, 1926, upon the application of Ben G. Parsons, of South Bend, Indiana, for an improvement in "Electric Servos for Vehicle Brakes," was erroneously issued to the inventor, said Parsons, whereas said Letters Patent should have been issued to *The Bendix Brake Company*, as assignee of the *entire* interest in said invention, as shown by the records of assignments in this office; and that the said Letters Patent should be read with this correction therein that the same may conform to the record of the case in the Patent Office.

Signed and sealed this 16th day of November, A. D. 1926.

[SEAL.]

M. J. MOORE,
*Acting Commissioner of Patents.*